United States Patent
Gu et al.

(10) Patent No.: US 12,522,851 B2
(45) Date of Patent: Jan. 13, 2026

(54) METHOD FOR PURIFYING INDOLE-3-LACTIC ACID FROM *Lactobacillus plantarum* FERMENTATION SUPERNATANT

(71) Applicant: Zhejiang Gongshang University, Zhejiang (CN)

(72) Inventors: Qing Gu, Zhejiang (CN); Qingqing Zhou, Zhejiang (CN); Ping Li, Zhejiang (CN); Rongcheng Gu, Zhejiang (CN)

(73) Assignee: Zhejiang Gongshang University, Hangzhou (CN)

( * ) Notice: Subject to any disclaimer, the term of this patent is extended or adjusted under 35 U.S.C. 154(b) by 530 days.

(21) Appl. No.: 18/054,142

(22) Filed: Nov. 9, 2022

(65) Prior Publication Data

US 2023/0071649 A1 Mar. 9, 2023

Related U.S. Application Data

(63) Continuation-in-part of application No. PCT/CN2022/074451, filed on Jan. 27, 2022.

(30) Foreign Application Priority Data

Aug. 6, 2021 (CN) .......................... 202110898824.5

(51) Int. Cl.
*C12P 17/10* (2006.01)
*C07D 209/18* (2006.01)

(52) U.S. Cl.
CPC ............ *C12P 17/10* (2013.01); *C07D 209/18* (2013.01)

(58) Field of Classification Search
CPC ... C12P 17/10; C07D 209/18; B01D 15/1871; B01D 15/265; B01D 15/325; B01D 15/34; C12R 2001/25
See application file for complete search history.

(56) References Cited

FOREIGN PATENT DOCUMENTS

| CN | 101353633 B | 12/2011 |
| CN | 111197015 B | 6/2022 |

OTHER PUBLICATIONS

Zhou et al., Foods 11, 3302, pp. 1-14, published Oct. 21, 2022.*

* cited by examiner

*Primary Examiner* — Delia M Ramirez

(57) ABSTRACT

The present invention discloses a method for purifying indole-3-lactic acid from a *Lactobacillus plantarum* fermentation supernatant, using a fermentation supernatant of *Lactobacillus plantarum* ZJ316 with a deposit number CCTCC NO: M 208077, including the following steps: adsorbing the fermentation supernatant with a macroporous resin XAD-16 first, then performing elution, collecting an eluate corresponding to 50% methanol with a pH of 7, and concentrating the eluate to obtain a concentrate; performing separation on the concentrate through dextrangel G25 to obtain a G25-2 fraction; and purifying the G25-2 fraction by reversed-phase high performance liquid chromatography, and concentrating the collected eluate to obtain the indole-3-lactic acid. The indole-3-lactic acid obtained in the present invention has a purity of 99.00%, and has broad-spectrum antibacterial activity.

7 Claims, 6 Drawing Sheets

METHOD FOR PURIFYING INDOLE-3-LACTIC ACID FROM *Lactobacillus plantarum* FERMENTATION SUPERNATANT

CROSS-REFERENCE TO RELATED APPLICATIONS

The present application is a continuation-in-part application of PCT application No. PCT/CN2022/074451 filed on Jan. 27, 2022, which claims the benefit of Chinese Patent Application No. 202110898824.5 filed on Aug. 6, 2021, each of which is incorporated by reference herein in its entirety.

TECHNICAL FIELD

The present invention belongs to the field of food biotechnology, and particularly relates to a method for extracting indole-3-lactic acid from a *Lactobacillus plantarum* fermentation supernatant.

BACKGROUND

Indole-3-lactic acid (ILA), a tryptophan metabolite with an indole ring, has a molecular weight of 205 Da and a molecular formula of $C_{11}H_{11}NO_3$, and has a structure as shown in Formula I. Lactic acid bacteria, such as *Bifidobacterium longum*, *Bifidobacterium infantis*, *Bifidobacterium breve*, *Lactobacillus salivarius*, *Lactobacillus plantarum* and *Lactobacillus reuteri*, can metabolize to produce indole-3-lactic acid. Compared with other strains, indole-3-lactic acid is the only tryptophan metabolite produced by *Bifidobacterium*. The *Bifidobacterium* strain isolated from the intestine of human infants was found to contain relatively high levels of indole-3-lactic acid, ranging from 22.17 to 33.12 μg/mL. The only strains of *Lactobacillus plantarum* that can metabolize to produce indole-3-lactic acid are *Lactobacillus plantarum* UM55, *Lactobacillus plantarum* dy-1 and *Lactobacillus plantarum* F51, with the content ranging from 4.30 to 30.70 μg/mL.

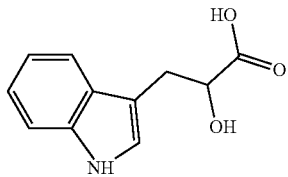

Formula I

Indole-3-lactic acid (ILA)

It is reported that indole-3-lactic acid has functional effects such as antioxidant activity, involvement in inducing immune regulation, inhibition of endogenous protein binding, and effectiveness in diabetes, inflammatory bowel disease and other metabolic diseases as a conservative biomarker for the diagnosis of alcoholic liver disease and gastric cancer. Therefore, indole-3-lactic acid will be widely used in the fields of medicine, food and health care.

At present, the main method for separating indole-3-lactic acid from a lactic acid bacteria fermentation supernatant is ultrafiltration centrifugation. Ultrafiltration centrifugation can retain molecules with a certain range of size, and substances of similar molecular weight are all retained by centrifugation. Due to different mechanical properties of filters, the content and purity of fractionated indole-3-lactic acid are prone to be different. Therefore, the screening of lactic acid bacteria with high yield of indole-3-lactic acid and the optimization of the method of separation and purification are of great significance for the extraction of indole-3-lactic acid from lactic acid bacteria sources.

The US200810062522.9, entitled "*Lactobacillus plantarum* ZJ316, Antimicrobial Peptide Produced Therefrom, Preparation and Use Thereof", provides a *Lactobacillus plantarum* strain isolated from infant feces-*Lactobacillus plantarum* ZJ316, with a deposit number CCTCC NO: M 208077. The obtained antibacterial peptide has a broad-spectrum antimicrobial effect.

The US201911341978.3, entitled "Direct Vat Set Lactic Acid Bacteria Starter and Preparation Method Thereof", provides a direct vat set lactic acid bacteria starter and a preparation method thereof. The direct vat set lactic acid bacteria starter is prepared by using *Lactobacillus plantarum* ZJ316 in lactic acid bacteria. The *Lactobacillus plantarum* has a deposit number CCTCC No: M 208077. The *Lactobacillus plantarum* ZJ316 has been deposited in China Center for Type Culture Collection on May 23, 2008, with the deposit number CCTCC NO: M 208077.

SUMMARY

The technical problem to be solved by the present invention is to provide a method for extracting indole-3-lactic acid from a *Lactobacillus plantarum* fermentation supernatant and determine antimicrobial activity of the indole-3-lactic acid.

In order to solve the above technical problem, the present invention provides a method for purifying indole-3-lactic acid from a *Lactobacillus plantarum* fermentation supernatant, using a fermentation supernatant of *Lactobacillus plantarum* ZJ316 with a deposit number CCTCC NO: M 208077, including the following steps:

1) adsorbing the fermentation supernatant with a macroporous resin XAD-16 first, then performing elution sequentially with ultrapure water, 30% methanol and 50% methanol with a pH of 7 at a flow rate of 1±0.1 mL/min, and collecting an eluate corresponding to the 50% methanol with a pH of 7; and
concentrating the eluate to obtain a concentrate;
2) performing separation on the concentrate obtained in step 1) through dextrangel G25 to obtain a G25-2 fraction; and
3) purifying the G25-2 fraction obtained in step 2) by reversed-phase high performance liquid chromatography (RP-HPLC):
where a mobile phase A is 0.05% (v/v) trifluoroacetic acid in water;
a mobile phase B is 0.05% (v/v) trifluoroacetic acid in acetonitrile;
an eluent is composed of the mobile phase A and the mobile phase B, a flow rate is 3±0.1 mL/min, and an elution procedure is as follows:

| RP-HPLC elution procedure | | | |
|---|---|---|---|
| Time (min) | Flow rate (mL/min) | Mobile phase A % | Mobile phase B % |
| 0 | 3 | 90.0 | 10.0 |
| 10 | 3 | 90.0 | 10.0 |
| 30 | 3 | 60.0 | 40.0 |

-continued

| RP-HPLC elution procedure | | | |
|---|---|---|---|
| Time (min) | Flow rate (mL/min) | Mobile phase A % | Mobile phase B % |
| 35 | 3 | 5.0 | 95.0 |
| 38 | 3 | 90.0 | 10.0 |
| 40 | 3 | 90.0 | 10.0 | i.e.: 0-10 min, mobile phase B 10%; 10-30 min, mobile phase B 10-40%; 30-35 min, mobile phase B 40-95%; 35-38 min, mobile phase B 95-10%; 38-40 min, mobile phase B 10%;

collecting the eluate at a peak time (start and end times) of 23.9273-24.5716 min to obtain an H4 fraction; and concentrating the collected eluate with a rotary evaporator to obtain the indole-3-lactic acid.

As an improvement of the method for purifying indole-3-lactic acid from a *Lactobacillus plantarum* fermentation supernatant according to the present invention, in step 1), the eluate is concentrated to 9-11% of the original volume to obtain the concentrate.

As a further improvement of the method for purifying indole-3-lactic acid from a *Lactobacillus plantarum* fermentation supernatant according to the present invention, step 1) includes:

adsorbing 5 L of the *Lactobacillus plantarum* ZJ316 supernatant with 500 g of the macroporous resin XAD-16 (the flow rate is 1 mL/min); and then performing the elution sequentially with 2 L of the ultrapure water, 2 L of the 30% methanol, 2 L of the 50% methanol with a pH of 7 at the flow rate of 1 mL/min, and collecting the eluate corresponding to the 50% methanol with a pH of 7.

As a further improvement of the method for purifying indole-3-lactic acid from a *Lactobacillus plantarum* fermentation supernatant according to the present invention, step 2) includes:

passing 2 mL of the concentrate obtained in step 1) through a 0.22 μm filter membrane, and loading the resulting liquid onto a Sephadex G25 column (with a height of 80 cm and a diameter of 1.6 cm);

performing elution by using ultrapure water as an eluent at a flow rate of 1±0.1 mL/min, receiving 1 tube of eluate every 3 min, and collecting the eluates in 4 tubes t39, t40, t41 and t42 (the eluates in these 4 tubes have the highest absorbance values in the $2^{nd}$ chromatogram peak at a wavelength of 280 nm); and concentrating the eluate to obtain the G25-2 fraction.

As a further improvement of the method for purifying indole-3-lactic acid from a *Lactobacillus plantarum* fermentation supernatant according to the present invention, the concentrating in step 2) includes: concentrating the eluate to a nearly dry state, and redissolving the solid with ultrapure water to 1 mL to obtain the G25-2 fraction.

As a further improvement of the method for purifying indole-3-lactic acid from a *Lactobacillus plantarum* fermentation supernatant according to the present invention, step 3) includes:

diluting 500 μL of the G25-2 fraction (stored at 4° C.) obtained in step 2) with ultrapure water to 5 mL, and loading the solution onto Waters SunFire C18 Prep (5 μm 10×100 mm) with a column temperature of 25° C. to obtain the H4 fraction; and concentrating the H4 fraction obtained in step 3) to a nearly dry state to obtain the indole-3-lactic acid.

As a further improvement of the method for purifying indole-3-lactic acid from a *Lactobacillus plantarum* fermentation supernatant according to the present invention, a method of preparing the fermentation supernatant includes:

inoculating an MRS medium with the *Lactobacillus plantarum* ZJ316 with the deposit number CCTCC NO: M 208077 according to an inoculum size of bacterial suspension of 3% (vol %), and performing fermentation (v/v) at a speed of 180 rpm at 37° C. for 24 h; and centrifuging the fermentation liquid (8,000 rpm, 25 min, 4° C.) to obtain the supernatant (with a pH of about 3.79).

The above fermentation may be performed in a small-scale bacterial fermentor, i.e., by inoculating 5 L of MRS with the *Lactobacillus plantarum* ZJ316 according to the inoculum size of bacterial suspension of 3%.

In the present invention, 5 L of the fermentation supernatant is adsorbed by 500 g of the macroporous resin XAD-16, and about 2 L of the 50% methanol eluate is obtained. Then the separation is performed through the dextrangel G25 to obtain the G25-2 fraction. The G25-2 fraction is purified by reversed-phase high performance liquid chromatography (RP-HPLC). The column model of the RP-HPLC is Waters SunFire C18 (Prep 5 μm 10×100 mm), and the mobile phases are 0.05% trifluoroacetic acid/water (A) (v/v) and 0.05% trifluoroacetic acid/acetonitrile (B) (v/v).

In the present invention, the content of the indole-3-lactic acid in the fermentation supernatant of *Lactobacillus plantarum* ZJ316 is determined according to the following method: A series of indole-3-lactic acid standards (Sigma) with concentration gradient are analyzed by analytical HPLC (the column model is Waters SunFire C18 (5 μm 4.6×250 mm), and a "peak area-concentration" linear relationship is established to obtain a regression equation. The content of indole-3-lactic acid in the fermentation supernatant of *Lactobacillus plantarum* ZJ316 measured by this method is 43.14 μg/mL, indicating that the *Lactobacillus plantarum* ZJ316 is one of the highest-yield *Lactobacillus plantarum* strains producing indole-3-lactic acid reported so far.

The indole-3-lactic acid obtained in the present invention has antibacterial activity, and can effectively inhibit the growth of *Salmonella, Escherichia coli, Micrococcus luteus, Staphylococcus aureus, Pseudomonas aeruginosa*, etc.

Compared with the related art, the present invention has the following technical advantages:

1. In the present invention, the content of indole-3-lactic acid in the fermentation supernatant of *Lactobacillus plantarum* ZJ316 determined by HPLC is 43.14 μg/mL, indicating that the *Lactobacillus plantarum* ZJ316 is one of the highest-yield *Lactobacillus plantarum* strains reported so far.
2. By using the "macroporous resin XAD-16-dextrangel G25-RP-HPLC" three-step method, the indole-3-lactic acid obtained from the fermentation supernatant of *Lactobacillus plantarum* ZJ316 has a purity of 99.00%, and has broad-spectrum antibacterial activity.

BRIEF DESCRIPTION OF THE DRAWINGS

The specific implementations of the present invention are described in detail with reference to the accompanying drawings.

Wherein: FIG. 2A is separation through dextrangel G25; FIG. 2B is separation & purification through reversed-phase high performance liquid chromatography (RP-HPLC); FIG. 2C is a liquid chromatogram of LC-MS; and FIG. 2D is a mass spectrogram of LC-MS.

DETAILED DESCRIPTION

The present invention is further described below with reference to specific embodiments, but the protection scope of the present invention is not limited thereto.

MRS liquid medium: 20 g of anhydrous glucose, 1 mL of Tween-80, 0.2 g of magnesium sulfate heptahydrate, 0.05 g of manganese sulfate, 10 g of tryptone, 5 g of yeast extract, 2 g of dipotassium hydrogen phosphate, 2 g of triammonium citrate, 10 g of beef extract and 5 g of anhydrous sodium acetate were dissolved in ultrapure water and made to 1 L, and adjusted to a pH 6 with 37.5% concentrated hydrochloric acid.

MRS solid medium: 2% (mass concentration) of bacterial medium agar was added to the above MRS liquid medium, and the medium was adjusted to a pH 6 with 37.5% concentrated hydrochloric acid.

Embodiment 1: Determination of Content of Indole-3-Lactic Acid in Fermentation Supernatant of *Lactobacillus plantarum* ZJ316

(1) A *Lactobacillus plantarum* ZJ316 strain was streaked in the MRS solid medium, and cultured at 37° C. for 36 h. A single colony was picked and subjected to static culture in 10 mL of MRS liquid medium at 37° C. for 24 h.

(2) 150 mL of the MRS liquid medium was inoculated with the culture solution obtained in step (1) according to an inoculum size of 3% (volume concentration) and subjected to static culture at 37° C. for 24 h.

(3) 5 L of MRS liquid medium was inoculated with the culture solution obtained in step (2) according to an inoculum size of 3% (volume concentration) and subjected to fermentation. The fermentation was carried out at a temperature of 37° C. and at a speed of 180 rpm for 24 h.

The obtained fermentation liquid was centrifuged at 8,000 rpm and at 4° C. for 25 min. The fermentation supernatant was stored at 4° C. for later use.

Figure 1:
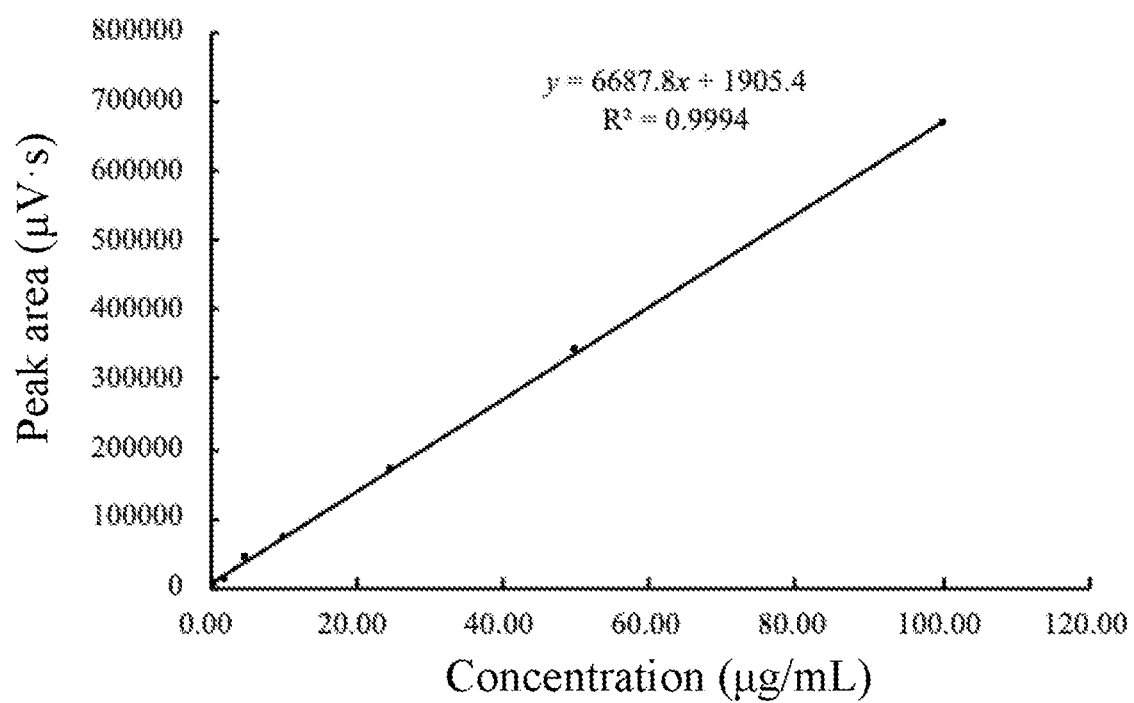
FIG. 1 is a regression equation diagram of indole-3-lactic acid standards.

(4) Ultraviolet detection conditions: Detector model: Waters 2498; detector wavelength: 280 nm; column temperature: 25° C.; and injection volume: 30 μL. A series of indole-3-lactic acid standards (purchased from Sigma) with concentration gradient (1.00, 2.50, 5.00, 10.00, 25.00, 50.00, 100.00 μg/mL) were determined. A peak area-concentration standard curve was established, and a regression equation y=6687.8x+1905.4 ($R^2$=0.9994) was calculated, as shown in FIG. 1.

(5) The content of indole-3-lactic acid in the fermentation supernatant obtained in step (3) was determined by analytical HPLC. The column model was Waters SunFire C18 (5 μm 4.6× 250 mm). 30 μL of the fermentation supernatant obtained in step (3) (stored at 4° C.) was injected into the column. The eluent was composed of a mobile phase A and a mobile phase B:

mobile phase A: 0.05% trifluoroacetic acid/water, i.e., 0.05% (v/v) trifluoroacetic acid in water; and mobile phase B: 0.05% trifluoroacetic acid/acetonitrile, i.e., 0.05% (v/v) trifluoroacetic acid in acetonitrile.

The elution procedure is shown in Table 1.

TABLE 1

| HPLC elution procedure | | | |
| --- | --- | --- | --- |
| Time (min) | Flow rate (mL/min) | Mobile phase A % | Mobile phase B % |
| 0 | 0.8 | 90.0 | 10.0 |
| 10 | 0.8 | 90.0 | 10.0 |
| 30 | 0.8 | 25.0 | 75.0 |
| 35 | 0.8 | 5.0 | 95.0 |
| 40 | 0.8 | 90.0 | 10.0 |
| 45 | 0.8 | 90.0 | 10.0 |

Under the 280 nm ultraviolet detection wavelength, the peak area of the chromatogram peak corresponding to the retention time of the indole-3-lactic acid standard was integrated. The resulting peak area 290395 (i.e., y=290395) was substituted into the regression equation y=6687.8x+1905.4 ($R^2$=0.9994) in FIG. 1. The content of indole-3-lactic acid in the fermentation supernatant of *Lactobacillus plantarum* ZJ316 was 43.14 μg/mL.

Embodiment 2: Separation & Purification and Identification of Indole-3-Lactic Acid Step I: Adsorption with Macroporous Resin XAD-16 and Elution (1) 5 L of the fermentation supernatant of *Lactobacillus plantarum* ZJ316 (obtained in step (3) in Embodiment 1) was adsorbed with 500 g of macroporous resin XAD-16 (the flow rate was 1 mL/min). Then elution was performed sequentially with 2 L of ultrapure water, 30% methanol, 50% methanol (adjusted to a pH 7 with 37.5% concentrated hydrochloric acid) at a flow rate of 1 mL/min, and the eluate corresponding to the 50% methanol with a pH of 7 was collected (about 2 L).

(2) The eluate (50% methanol eluate) obtained in step (1) was concentrated with a rotary evaporator to 200 mL to obtain a concentrate. The rotary evaporation was performed at a water bath temperature of 37° C. under a pressure of 30±5 mbar and at a speed of 60 rpm.

Step II: Separation Through Sephadex G25 Column (1) Separation was performed on the concentrate obtained in step I through a Sephadex G25 column (with a height of 80 cm and a diameter of 1.6 cm).

2 mL of the concentrate obtained in step I was passed through a 0.22 μm filter membrane. Elution was performed using ultrapure water as the eluent at a flow rate of 1 mL/min. 1 tube of eluate was received by an automatic sample receiver every 3 min, that is, the volume of the G25 eluate in each tube was 3 mL.

Figure 2A:
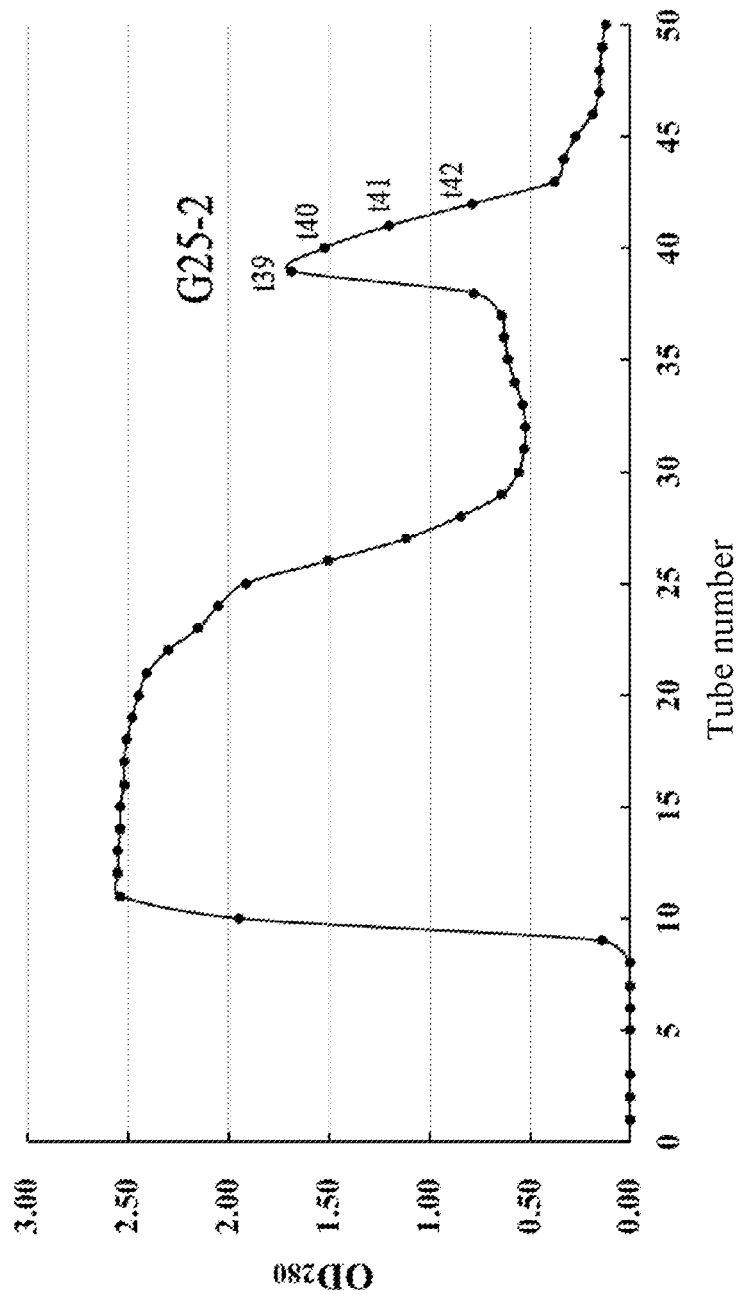
FIG. 2A-2D show separation & purification and identification of indole-3-lactic acid in a fermentation supernatant of *Lactobacillus plantarum* ZJ316.

(2) The absorbance value of the eluate at 280 nm wavelength in each tube was detected using an ultraviolet spectrophotometer and recorded, and an absorbance value-tube number curve was drawn, as shown in FIG. 2A. The samples corresponding to tube numbers "t39, t40, t41 and t42" were collected, with a total volume of 12 mL, and denoted as "G25-2".

(3) The G25-2 (12 mL) obtained in step (2) was concentrated to a nearly dry state with a rotary evaporator, and redissolved with ultrapure water to 1 mL to obtain a G25-2 fraction, which was stored at 4° C. for later use.

The rotary evaporation was performed at a water bath temperature of 37° C. under a pressure of 30±5 mbar and at a speed of 60 rpm.

Step III: Purification by Reversed-Phase High Performance Liquid Chromatography (RP-HPLC)

500 μL of the G25-2 fraction (stored at 4° C.) obtained in step II was diluted with ultrapure water to 5 mL. The column model of RP-HPLC was Waters SunFire C18 Prep (5 μm 10× 100 mm), and the column temperature was 25° C. The detector model was Waters 2998, and the detector wavelength was 280 nm. The flow rate was 3 mL/min.

The eluent was composed of a mobile phase A and a mobile phase B:

mobile phase A: 0.05% trifluoroacetic acid/water, i.e., 0.05% (v/v) trifluoroacetic acid in water; and mobile phase B: 0.05% trifluoroacetic acid/acetonitrile, i.e., 0.05% (v/v) trifluoroacetic acid in acetonitrile.

The elution procedure is shown in Table 2.

Figure 2B:
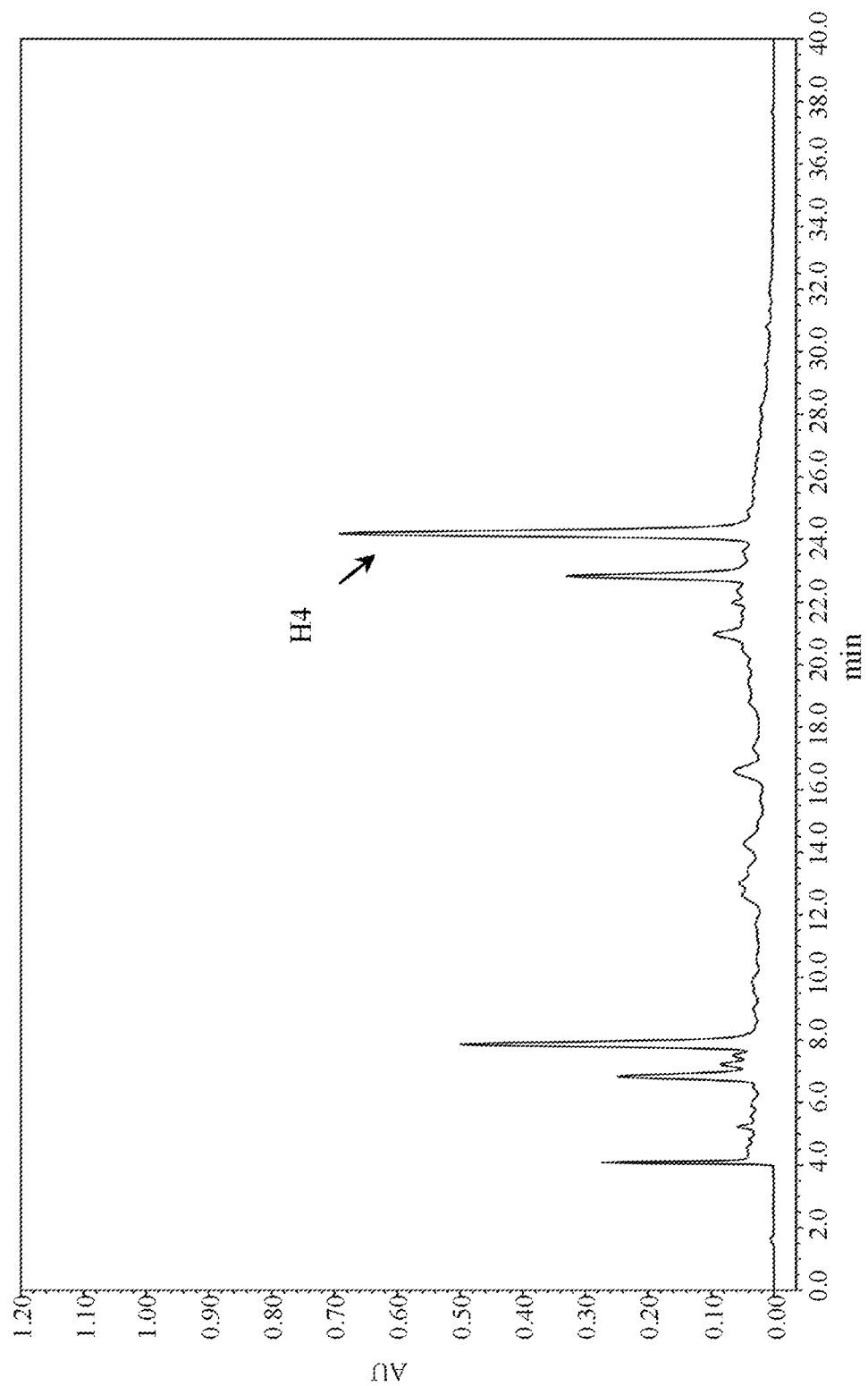

The RP-HPLC chromatogram is shown in FIG. 2B. The sample at the peak start and end times of 23.9273-24.5716 min was collected and denoted as "H4".

TABLE 2

RP-HPLC elution procedure

| Time (min) | Flow rate (mL/min) | Mobile phase A % | Mobile phase B % |
|---|---|---|---|
| 0 | 3 | 90.0 | 10.0 |
| 10 | 3 | 90.0 | 10.0 |
| 30 | 3 | 60.0 | 40.0 |
| 35 | 3 | 5.0 | 95.0 |
| 38 | 3 | 90.0 | 10.0 |
| 40 | 3 | 90.0 | 10.0 |

Step IV: Determination of Molecular Weight by LC-MS

The H4 sample (about 1.93 mL) obtained in step III was concentrated to a nearly dry state with a rotary evaporator, and redissolved with ultrapure water to 50 μL. The rotary evaporation was performed at a water bath temperature of 37° C. under a pressure of 30±5 mbar and at a speed of 60 rpm. The molecular weight of the concentrate was determined.

The LC-MS instrument model was Agilent 1200-6210, the column model was Waters SunFire C18 (5 μm 4.6×250 mm), and the column temperature was 30° C. The ion source was ESI in a negative ion mode. The gas temperature of the ion source was 350° C. The flow rate of drying gas was 9 L/min. The pressure of atomized gas was 45 psi. The capillary voltage was 3,500 V, and the fragmentor voltage was 125 V. The mass range was 50-2,000 m/z. The injection volume was 10 μL.

The HPLC eluent was composed of a mobile phase A and a mobile phase B:

mobile phase A: 0.1% formic acid/water, i.e., 0.1% (v/v) formic acid in water; and mobile phase B: 0.1% formic acid/acetonitrile, i.e., 0.1% (v/v) formic acid in acetonitrile.

The elution procedure is shown in Table 3.

Mobile phase: 0.1% formic acid in water (A) and in acetonitrile (B).

Figure 2C:
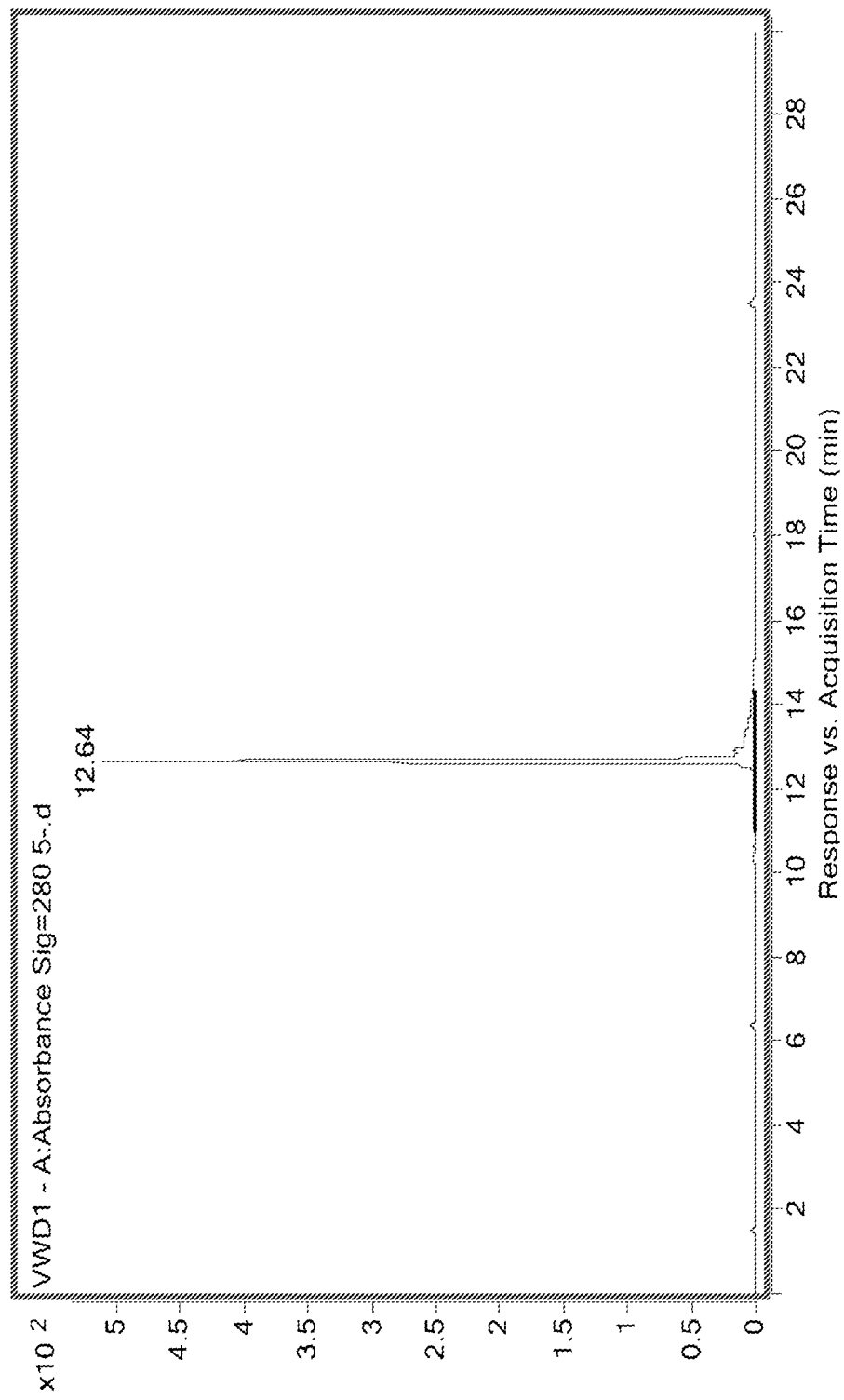
Figure 2D:
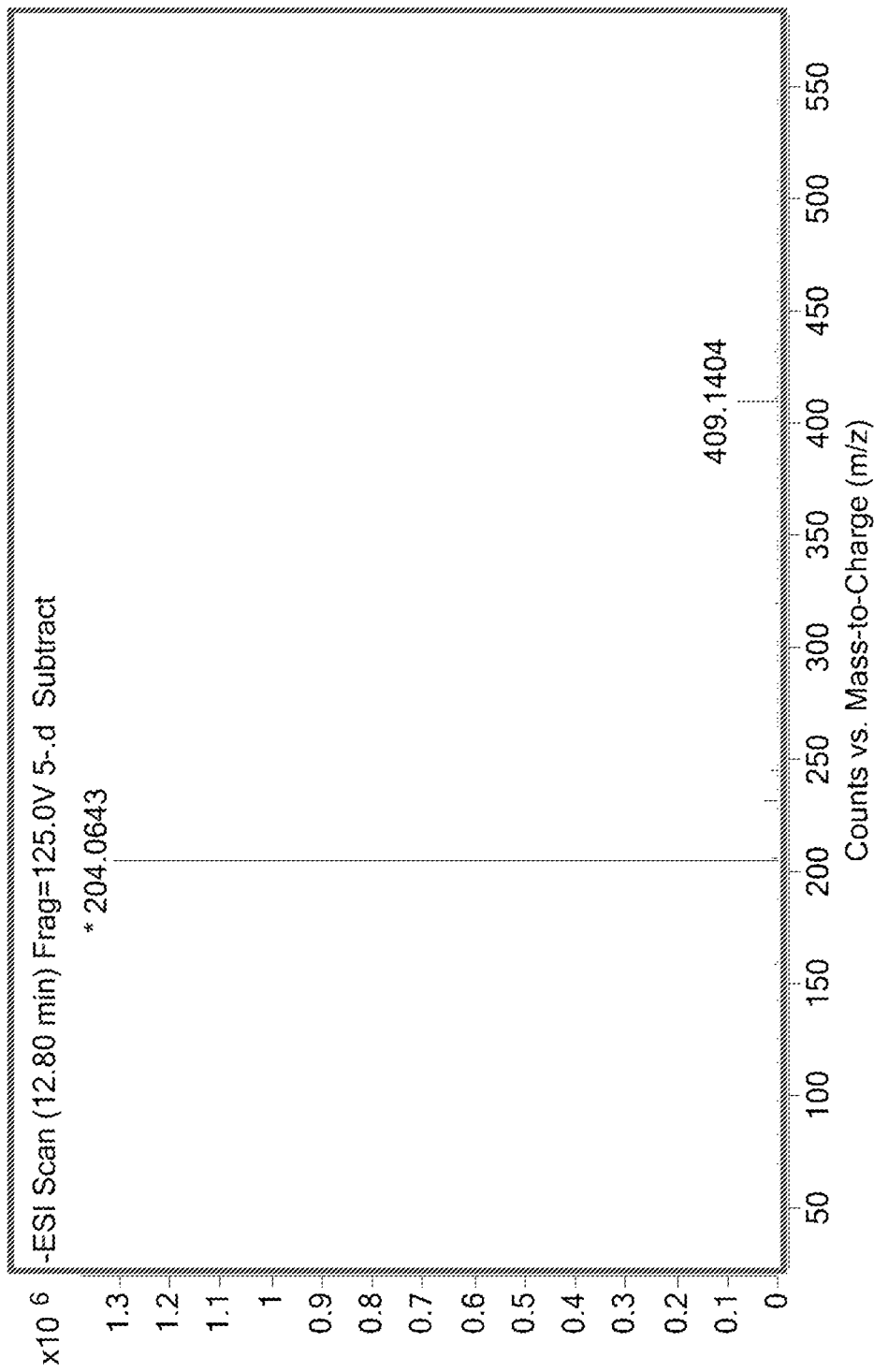

The LC-MS chromatograms of the concentrated H4 sample are shown in FIG. 2C and FIG. 2D. FIG. 2C shows a liquid chromatogram of the H4 sample, and FIG. 2D shows a mass spectrogram of the H4 sample. The molecular weight of the H4 sample was determined to be 205.

Therefore, it was proved that the product obtained after concentrating the H4 fraction was indole-3-lactic acid indeed.

TABLE 3

HPLC elution procedure

| Time (min) | Flow rate (mL/min) | Mobile phase A % | Mobile phase B % |
|---|---|---|---|
| 0 | 0.5 | 90.0 | 10.0 |
| 10 | 0.5 | 90.0 | 10.0 |
| 20 | 0.5 | 60.0 | 40.0 |
| 25 | 0.5 | 5.0 | 95.0 |
| 30 | 0.5 | 90.0 | 10.0 |

Figure 3:
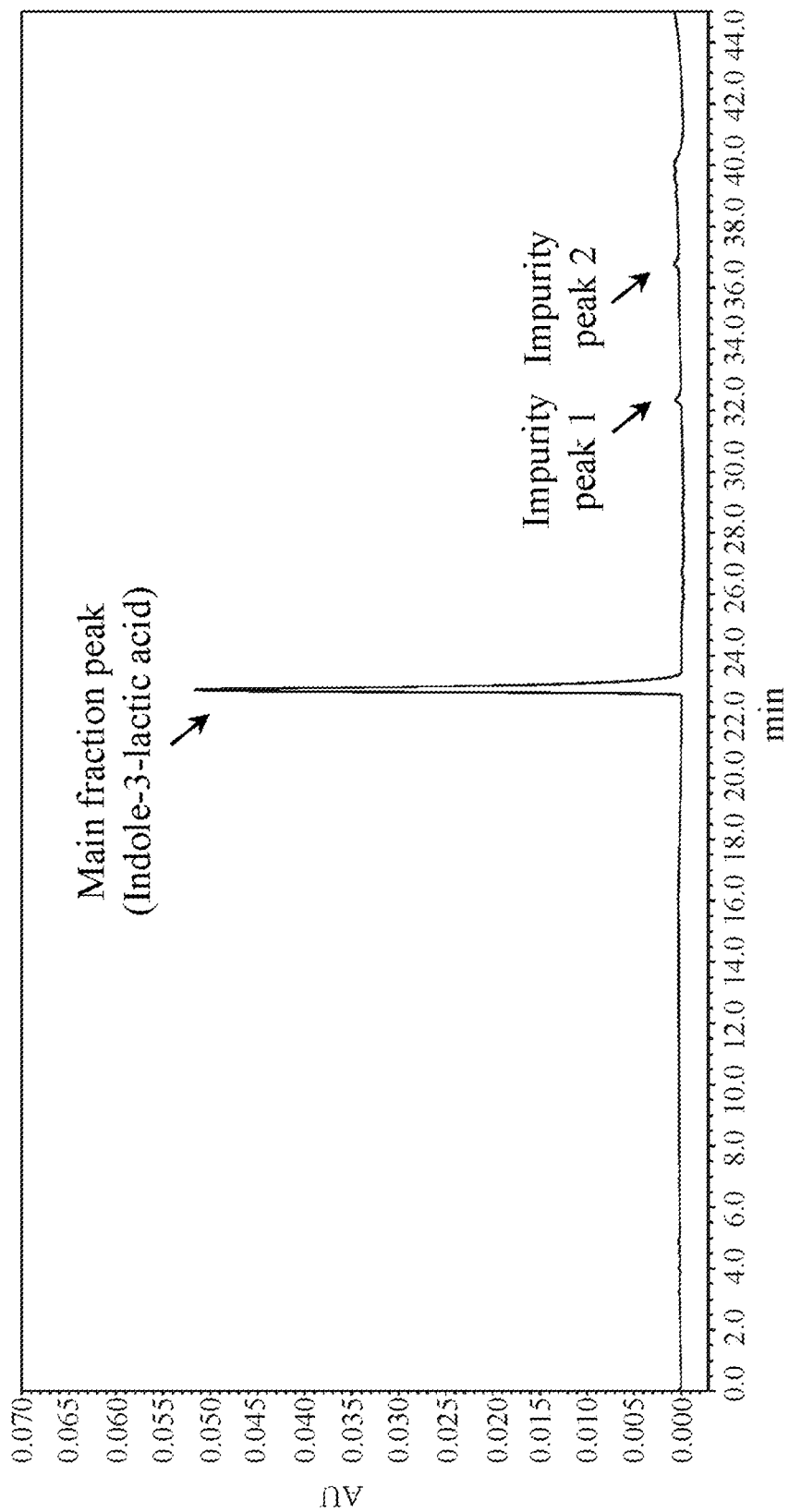
FIG. 3 shows analysis of purity of indole-3-lactic acid by analytical HPLC.

Embodiment 3: Determination of Purity of Separated and Purified Indole-3-Lactic Acid The concentrated sample "H4" obtained in step III in Embodiment 2 was subjected to the analytical HPLC and the elution procedure according to step (5) in Embodiment 1 to obtain a chromatogram of the indole-3-lactic acid, as shown in FIG. 3. The peak start and end times (min), the peak areas (μV·s) and the peak area ratio (%) of the main fraction peak (i.e., indole-3-lactic acid) and 2 impurity peaks are shown in Table 4. According to the peak area normalization method, assuming that the area of the main fraction peak (i.e., indole-3-lactic acid) is A and the total of the area of the main fraction peak and the impurity peaks is $\Sigma A$, then a formula for calculating the purity of indole-3-lactic acid (%) is obtained:

Purity of indole-3-lactic acid (%)=$A/\Sigma A \times 100\%$.

TABLE 4

Peak area of HPLC chromatogram peaks

| Chromatogram peak | Peak start and end times (min) | Peak area (μV · s) | Peak area ratio (%) |
|---|---|---|---|
| Main fraction peak (A) | 22.6886-23.5207 | 691433 | 99.00 |
| Impurity peak 1 (A1) | 32.2062-32.4906 | 4028 | 0.58 |
| Impurity peak 2 (A2) | 36.6500-36.9206 | 2933 | 0.42 |

Therefore, through the separation and purification in steps I to III in Embodiment 2, the following formula was obtained:

$$\text{Purity of indole-3-lactic acid (\%)} = A/(A + A1 + A2) \times 100\%$$

$$= 691433/(691433 + 4028 + 2933) \times 100\%$$

$$= 99.00\%.$$

Embodiment 4: Antimicrobial Activity of Indole-3-Lactic Acid

The antibacterial activity of indole-3-lactic acid obtained by purification in step III in Embodiment 2 (i.e., concentrated H4 with a purity of 99.00%) was determined by an oxford cup method. 1% (volume concentration) of indicator bacteria was added to 150 μL of 10 mg/ml indole-3-lactic acid (dissolved in 1% acetonitrile aqueous solution). The result showed that the indole-3-lactic acid produced by the *Lactobacillus plantarum* ZJ316 may inhibit growth of indicator bacteria (as shown in Table 5), including Gram-positive bacteria (*Micrococcus luteus*, *Staphylococcus aureus*, *Staphylococcus carnosus*, *Staphylococcus simulans*, etc.) and Gram-negative bacteria (*Escherichia coli*, *Salmonella* paratyphi A/B, *Salmonella enterica*, *Salmonella choleraseuis*, *Salmonella typhimurium*, etc.). *Listeria monocytogenes* LM1, *Bacillus subtilis* BAS2, *Salmonella* paratyphi B CMCC50094, *Salmonella* paratyphi A CMCC50093, *Salmonella enterica* subsp. *arizonae* CMCC (B) 47001 and *Salmonella typhimurium* CMCC50015 were purchased from National Center for Medical Culture Collections (CMCC). *Escherichia coli* DH5a was purchased from Sangon Biotech (Shanghai) Co., Ltd. *Staphylococcus aureus* ATCC25923, *Pseudomonas aeruginosa* ATCC47085, *Salmonella enterica* subsp. *enterica* ATCC14028 and *Salmonella* choleraseuis ATCC13312 were purchased from American Type Culture Collection (ATCC). *Micrococcus luteus* CICC 10209 was purchased from China Center of Industrial Culture Collection (CICC). *Staphylococcus citreus* LC5 was purchased from China Center for Type Culture Collection (CCTCC). *Staphylococcus simulans*, *Staphylococcus warneri*, *Staphylococcus carnosus* pCA44 and *Staphylococcus carnosus* pot20 were presented by Professor Eefjan Breukink of Utrecht University in the Netherlands.

TABLE 5

Inhibition spectrum of indole-3-lactic acid produced by *Lactobacillus plantarum* ZJ316

|   | Indicator bacteria | Diameter of inhibition zone (mm) |
|---|---|---|
| G− | *Salmonella paratyphi* B CMCC50094 | 13.19 ± 0.21 |
|   | *Salmonella paratyphi* A CMCC50093 | 15.06 ± 0.08 |
|   | *Salmonella enterica* subsp. *arizonae* CMCC(B)47001 | 13.44 ± 0.45 |
|   | *Salmonella enterica* subsp. *enterica* ATCC14028 | 12.82 ± 0.17 |
|   | *Salmonella choleraseuis* ATCC13312 | 13.60 ± 0.23 |
|   | *Salmonella typhimurium* CMCC50015 | 12.69 ± 0.18 |
|   | *Escherichia coli* DH5α | 12.50 ± 0.17 |
|   | *Pseudomonas aeruginosa* ATCC47085 | 10.66 ± 0.08 |
|   | *Bacillus subtilis* BAS2 | 15.67 ± 0.01 |
|   | *Micrococcus luteus* CICC 10209 | 19.06 ± 0.76 |
|   | *Staphylococcus aureus* ATCC25923 | 13.40 ± 0.25 |
|   | *Staphylococcus simulans* | 13.40 ± 0.25 |
| G+ | *Staphylococcus warneri* | 18.76 ± 0.06 |
|   | *Staphylococcus carnosus* pCA44 | 16.45 ± 0.27 |
|   | *Staphylococcus carnosus* pot20 | 15.01 ± 0.55 |
|   | *Staphylococcus citreus* LC5 | 13.06 ± 0.08 |
|   | *Listeria monocytogenes* LM1 | 10.95 ± 0.07 |

Comparative Example 1: The *Lactobacillus plantarum* ZJ316 in Embodiment 1 was changed to other existing *Lactobacillus plantarum* strains, as shown in Table 6 below, and the rest was the same as in Embodiment 1. The content of indole-3-lactic acid in the fermentation supernatant of *Lactobacillus plantarum* was detected (μg/mL). The comparison between the obtained experimental results and the present invention is shown in Table 6. The *Lactobacillus plantarum* ZJ316 and the *Lactobacillus plantarum* ZFM55 were screened from feces of healthy newborn infants. The *Lactobacillus plantarum* ZFM9 and the *Lactobacillus plantarum* LZ206 were screened from fresh milk. The screening medium was an MRS solid medium containing 2% calcium carbonate (the MRS solid medium was purchased from Zhejiang Changqing Chemical Co., Ltd.). All the strains were deposited in China Center for Type Culture Collection (CCTCC), No. 299 Bayi Road, Wuchang District, Wuhan City, Hubei Province.

TABLE 6

| Strain name (deposit number) | Content of indole-3-lactic acid (μg/mL) |
|---|---|
| *Lactobacillus plantarum* ZJ316 (CCTCC NO: M 208077) | 43.14 |
| *Lactobacillus plantarum* ZFM55 (CCTCC M. 2016631) | About 31 |
| *Lactobacillus plantarum* ZFM9 (CCTCC M. 2016630) | About 25 |
| *Lactobacillus plantarum* LZ206 (CCTCC AB 2016120) | About 22 |

Comparative Example 2: The fermentation supernatant of *Lactobacillus plantarum* ZJ316 obtained in Embodiment 1 was subjected to ultrafiltration centrifugation. The technical parameters of the ultrafiltration centrifugation were specifically as follows: the supernatant of *Lactobacillus plantarum* ZJ316 was passed through a 0.22 μm filter membrane, the resulting liquid was centrifuged (4,000 g, 4° C., 30 min) with a 3 kDa ultrafiltration centrifuge tube (Millipore Amicon Ultra), and the filtrate was collected. The filtrate obtained by the ultrafiltration centrifugation was tested for purity according to the method in Embodiment 3. The purity of the obtained indole-3-lactic acid was about 40%.

Comparative Example 3: The "macroporous resin XAD-16" in step I in Embodiment 2 was changed to "macroporous resin XAD-2", and the rest was the same as in Embodiment 2. Correspondingly, the purity of the obtained indole-3-lactic acid was about 95%.

Comparative Example 4-1: The "30% methanol" in step I in Embodiment 2 was changed to "25% methanol", and the rest was the same as in Embodiment 2. The purity of the obtained indole-3-lactic acid was about 83%.

Comparative Example 4-2: The "30% methanol" in step I in Embodiment 2 was changed to "35% methanol", and the rest was the same as in Embodiment 2. The purity of the obtained indole-3-lactic acid was about 94%.

Comparative Example 4-3: The eluent "30% methanol" in step I in Embodiment 2 was eliminated, i.e., the elution was performed sequentially with "2 L of ultrapure water and 50% methanol (pH 7)", and the rest was the same as in Embodiment 2. The purity of the obtained indole-3-lactic acid was about 35%.

Comparative Example 4-4: The "50% methanol (pH 7)" in step I in Embodiment 2 was changed to "50% methanol", i.e., the adjustment of the pH of the 50% methanol was eliminated, and the rest was the same as in Embodiment 2. The purity of the obtained indole-3-lactic acid was about 75%.

Comparative Example 5: The "Sephadex G25 column" in step II in Embodiment 2 was changed to "Sephadex G50 column" or "Sephadex G15 column", and the rest was the same as in Embodiment 2. When the "Sephadex G50 column" was adopted, a chromatogram similar to FIG. 2A may not be obtained, and the chromatogram only contained 1 sample peak, i.e., the fraction G25-2 may not be obtained. When the "Sephadex G15 column" was adopted, a chromatogram similar to FIG. 2A may be obtained, and the chromatogram contained 2 sample peaks, i.e., the fraction G25-2 may be obtained. The rest was the same as in Embodiment 2. Correspondingly, the purity of the obtained indole-3-lactic acid was about 78%.

Comparative Example 6: The flow rate "1 mL/min" corresponding to the Sephadex G25 column in step II in Embodiment 2 was changed to "0.5 mL/min" or "1.5 mL/min", and the rest was the same as in Embodiment 2. Correspondingly, the purity of the obtained indole-3-lactic acid was about 98% and 70% respectively.

Comparative Example 7: The column "Waters SunFire C18 Prep (5 μm 10×100 mm)" used in the reversed-phase high performance liquid chromatography (RP-HPLC) in step III in Embodiment 2 was changed to "YMC-Pack Pro C18 (5 μm 20×150 mm)", and the rest was the same as in Embodiment 2. A chromatogram similar to FIG. 2B may not be obtained, i.e., the single-peak fraction H4 may not be obtained.

Comparative Example 8: The elution procedure of reversed-phase high performance liquid chromatography (RP-HPLC) in step III in Embodiment 2 was changed to:

0-10 min, mobile phase B 5%; 10-30 min, mobile phase B 5-50%; 30-35 min, mobile phase B 50-95%; 35-38 min, mobile phase B 95-5%; 38-40 min, mobile phase B 5%; flow rate 3 mL/min.

Alternatively, 0-10 min, mobile phase B 10%; 10-30 min, mobile phase B 10-50%; 30-35 min, mobile phase B 50-95%; 35-38 min, mobile phase B 95-10%; 38-40 min, mobile phase B 10%; flow rate 3 mL/min.

Alternatively, 0-10 min, mobile phase B 5%; 10-30 min, mobile phase B 5-40%; 30-35 min, mobile phase B 40-95%; 35-38 min, mobile phase B 95-5%; 38-40 min, mobile phase B 5%; flow rate 3 mL/min.

Alternatively, 0-10 min, mobile phase B 10%; 10-30 min, mobile phase B 10-40%; 30-35 min, mobile phase B 40-95%; 35-38 min, mobile phase B 95-10%; 38-40 min, mobile phase B 10%; flow rate 2 mL/min.

Alternatively, 0-10 min, mobile phase B 10%; 10-30 min, mobile phase B 10-40%; 30-35 min, mobile phase B 40-95%; 35-38 min, mobile phase B 95-10%; 38-40 min, mobile phase B 10%; flow rate 4 mL/min.

The rest was the same as in Embodiment 2. Correspondingly, the purity of the obtained indole-3-lactic acid was about 92%, 96%, 96%, 90% and 82% respectively.

Finally, it should be further noted that the foregoing examples are only some specific embodiments of the present invention. Obviously, the present invention is not limited to the foregoing embodiments, and may further include many modifications. All deformations that a person of ordinary skill in the art can directly derive or associate from the disclosure of the present invention shall be considered as the protection scope of the present invention.

What is claimed is:

1. A method for purifying indole-3-lactic acid from a fermentation supernatant of *Lactobacillus plantarum*, wherein said *Lactobacillus plantarum* is *Lactobacillus plantarum* ZJ316 having the deposit number CCTCC NO: M 208077, comprising the following steps:
    (a) adsorbing the fermentation supernatant with a macroporous resin XAD-16, followed by elution at a pH of 7 and a flow rate of 1±0.1 mL/min, wherein a first elution is performed with ultrapure water, a second elution is performed with a 30% methanol solution, and a third elution is performed with a 50% methanol solution; collecting an eluate from the third elution; and concentrating the eluate to obtain a concentrate;
    (b) performing separation of the concentrate obtained in step (a) with a dextran gel G25 column to obtain a fraction containing indole-3-lactic acid; and
    (c) purifying the fraction obtained in step (b) by reversed-phase high performance liquid chromatography (HPLC).

2. The method according to claim 1, wherein in step (a), the eluate is concentrated to 9-11% of the original volume to obtain the concentrate.

3. The method according to claim 1, wherein in step (a) the volume of the fermentation supernatant is 5 L, the flow rate is 1 mL/min, the volume of the ultrapure water used in the first elution is 2 L, the volume of the 30% methanol solution used in the second elution is 2 L, and the volume of the 50% methanol solution used in the third solution is 2 L.

4. The method according to claim 1, wherein the method further comprises:
    (i) passing the concentrate obtained in step (a) through a 0.22 μm filter membrane prior to performing the separation of step (b); and
    (ii) concentrating the fraction obtained in step (b) prior to the purification of step (c).

5. The method according to claim 4, wherein the method further comprises concentrating the fraction obtained in step (b) to a dry state and redissolving the dried fraction with ultrapure water to a volume of 1 mL.

6. The method according to claim 4, wherein the reverse-phase HPLC purification step is carried out at a temperature of 25° C.

7. The method according to claim 1, wherein the fermentation supernatant is prepared by:
    (i) inoculating an MRS (De Man, Rogosa, and Sharpe) medium with the *Lactobacillus plantarum* ZJ316 having the deposit number CCTCC NO: M 208077;
    (ii) performing a fermentation of the MRS medium containing *Lactobacillus plantarum* ZJ316 having the deposit number CCTCC NO: M 208077 at a speed of 180 RPM and at 37° C. for 24 hours to obtain a fermentation liquid; and
    (iii) centrifuging the fermentation liquid to obtain the fermentation supernatant.

* * * * *